(12) United States Patent
Bodano

(10) Patent No.: US 8,035,312 B2
(45) Date of Patent: Oct. 11, 2011

(54) SYSTEM FOR SUPPLYING CURRENT TO A LOAD

(75) Inventor: Emanuele Bodano, Padua (IT)

(73) Assignee: Infineon Technologies Austria AG, Villach (AT)

( * ) Notice: Subject to any disclaimer, the term of this patent is extended or adjusted under 35 U.S.C. 154(b) by 336 days.

(21) Appl. No.: 12/433,194

(22) Filed: Apr. 30, 2009

(65) Prior Publication Data

US 2010/0277088 A1    Nov. 4, 2010

(51) Int. Cl.
*H05B 37/02* (2006.01)
(52) U.S. Cl. .............. 315/291; 315/307; 315/209 R
(58) Field of Classification Search ............ 315/224, 315/209 R, 291, 307, 308, 360, 362
See application file for complete search history.

(56) References Cited

U.S. PATENT DOCUMENTS

| | | | |
|---|---|---|---|
| 7,282,870 B2 * | 10/2007 | Gong et al. | 315/291 |
| 7,388,335 B2 * | 6/2008 | Kastle | 315/209 R |
| 2004/0155602 A1 * | 8/2004 | Buij et al. | 315/291 |
| 2007/0210725 A1 | 9/2007 | Marosek | |
| 2010/0308749 A1 * | 12/2010 | Liu | 315/307 |

* cited by examiner

*Primary Examiner* — Don Le
(74) *Attorney, Agent, or Firm* — Dicke, Billig & Czaja, PLLC

(57) ABSTRACT

A system for supplying current to a load is disclosed. One embodiment provides a switching converter for providing a load current to the load. The switching regulator includes a switching circuit. A current control unit generates a modulated current control signal representing a desired load current. The switching circuit is driven dependent on the modulated current control signal. A logic circuit receives a pulse-width-modulated control signal representing a desired dimming ratio and is configured to generate a gate signal for driving the switching circuit dependent on the current control signal during a duty cycle of the pulse-width-modulated control signal. The logic circuit is configured to activate the switching converter, independent on the state of the current control signal, at the beginning of the duty cycle of the pulse-width-modulated control signal.

15 Claims, 3 Drawing Sheets

SYSTEM FOR SUPPLYING CURRENT TO A LOAD

BACKGROUND

This disclosure relates to power supply systems, and in one or more embodiments, to light-emitting diode (LED) dimming control circuitry and methodology that allows a LED driver to increase the maximum pulse-width modulation (PWM) dimming ratio and avoid LED flicker.

Dimming control for light-emitting diodes (LEDs) may be utilised to provide control of LED brightness without changing LED colour. Thereby, a LED current may be pulse-width modulated with a controllable duty cycle to set a desired level of radiant power (i.e., radiant flux) of the LED. A pulse-width modulated (PWM) control signal with a pre-defined period $T_{PWM}$ (cycle time) assumes a high level during an on-time (pulse-width) $T_{ON}=D_{PWM} \cdot T_{PWM}$ and a low level during an off-time $T_{OFF}=(1-D_{PWM}) \cdot T_{PWM}$ (or vice versa if using inverted logic levels). The ratio $D_{PWM}=T_{ON}/T_{PWM}$ between the on-time $T_{ON}$ and the period $T_{PWM}$ is called duty cycle which is a number between 0 and 1 (often expressed as percentage between 0 and 100 percent). A maximum LED current $i_{MAX}$ that defines the maximum "brightness" (precisely the maximum radiant power) of the LED is "chopped" (i.e., alternately switched on and off) according to the PWM control signal. The average LED current $i_{AVG}$ results in $i_{AVG}=D_{PWM} \cdot i_{MAX}$. Thus the brightness of the LED can be varied, i.e., the LED can be dimmed by adjusting the duty cycle of the PWM control signal.

In practice commonly used current sources for driving the LED are switching converters with output current control since switching converters provide a comparable high degree of efficiency in terms of power losses.

However, when using switching converters the ratio $T_{ON}/T_{PWM}$ (duty cycle) can not be reduced down to arbitrarily low values, i.e., the lower bound for the duty cycle is $D_{PWM,min}=T_{ON,min}/T_{PWM}$, whereby the minimum on-time $T_{ON,min}$ depends on the clock frequency (switching frequency $f_{CLK}$) of the switching converter.

For applications that require a brightness control over a large range and down to very low brightness levels the minimum duty cycle has to be made low which requires the LED driver (i.e., the controllable current source, often switching converters with current control) to be capable of responding to a very low duty cycle PWM control signal. However, a random delay can be observed between a rising edge of the PWM control signal (or a falling edge if using inverted logic levels) and a corresponding edge of the actual LED current. This random delay may be due to a random phase relation between the PWM control signal and the clock signal of the switching converter. At very low duty cycles the duration of the random delay may be a significant fraction of the on-time of the PWM control signal which may result in a flickering of the LED that is visible to the human eye. Furthermore, in cases of a rather long duration of the random delay the "remaining" on-time may be too short for the actual LED current to reach its maximum value $i_{MAX}$ which also results in flicker effects and variations in colour.

In practice the minimum on time $T_{ON,min}$ has to be eight to ten times the period (cycle time $f_{CLK}^{-1}$) of the clock signal of the switching converter. However, for certain applications where a large range of brightness control is required it would be desirable to achieve very lower duty cycles in order to allow for brightness control down to very low brightness levels. There is a need for a novel dimming control technique allowing for a very large range of brightness control without illustrating flicker effects.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

A system for supplying current to a load is disclosed. In one embodiment, the system includes: a switching converter for providing a load current to the load; the switching regulator includes a switching circuit; a current control unit generating a modulated current control signal representing a desired load current, the switching circuit being driven dependent on the modulated current control signal; and a logic circuit receiving a pulse-width-modulated control signal representing a desired dimming ratio and configured to generate a gate signal for driving the a switching circuit dependent on the current control signal during a duty cycle of the pulse-width-modulated control signal, whereby the logic circuit is configured to activate the switching converter, independent on the state of the current control signal, at the beginning of the duty cycle of the pulse-width-modulated control signal.

As mentioned above, switching converters having a controllable output current are commonly used as controllable current sources (i.e., as LED driver circuits) for driving LED based illumination devices since switching converters provide a higher degree of efficiency in terms of power losses than linear current regulators.

Figure 1:
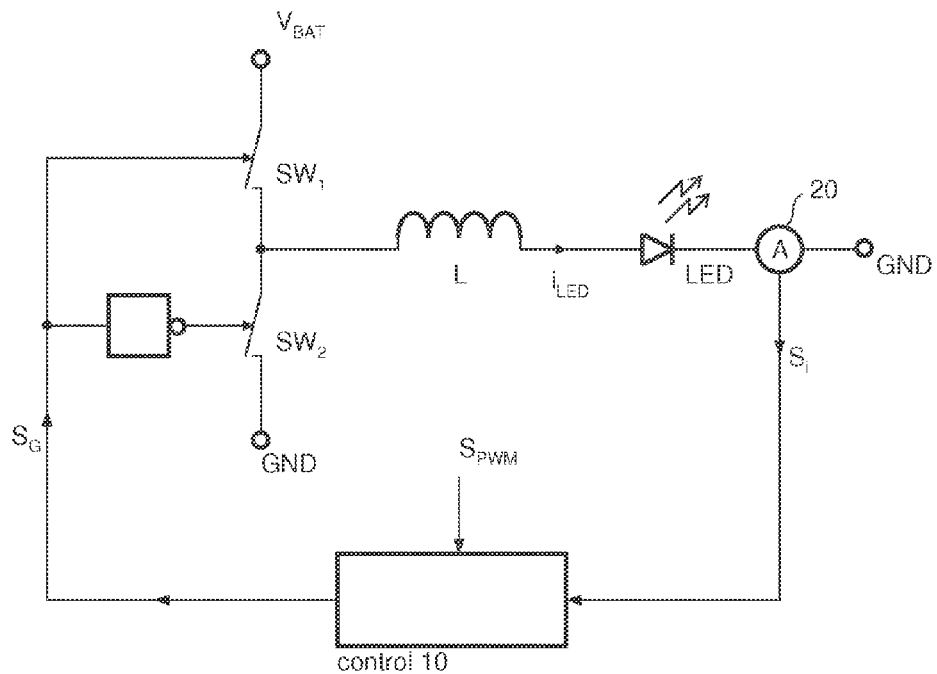
FIG. 1 illustrates one embodiment of a system including an LED driver circuit including a switching converter.

A block diagram illustrating one embodiment of an LED driver circuit including a switching converter for supplying a load current $i_{LED}$ to a light-emitting diode is illustrated in FIG. 1. The driver circuit includes a half-bridge with two semiconductor switches (for example MOSFETs) connected between an upper supply potential $V_{BAT}$ and a lower supply potential which may be, for example, ground potential GND. A high-side semiconductor switch $SW_1$ of the half bridge is controlled by a gate signal $S_G$ whereas a low-side semiconductor switch $SW_2$ is controlled by an inverted version of the gate signal $S_G$. A common circuit node interconnecting the high-side switch $SW_1$ and the low-side switch $SW_2$ forms an output node of the half-bridge that provides the load current $i_{LED}$ to the LED via an inductor L whereby the inductor L and the LED are connected in series between the output node of the half bridge and a circuit node that is held on ground potential GND. The switching converter topology used here is a buck converter topology. However, other converter topologies are applicable.

The LED driver further includes a current measurement unit 20 that provides a current measurement signal $S_i$ representing the actual load current $i_{LED}$ or a low-pass filtered (i.e., averaged) version thereof. The current measurement signal $S_i$ is supplied to a control unit 10 which additionally receives a PWM control signal $S_{PWM}$ whose duty cycle determines the dimming of the LED. For example, if the duty cycle is 100 percent, the LED will radiate the maximum power, if the duty cycle is reduced to 30 percent, the LED is dimmed to radiate only 30 percent of the maximum radiant power.

The function of the control unit 10 will be explained below by using timing diagrams of the PWM control signal $S_{PWM}$, the load current of the LED $i_{LED}$, a clock signal $S_{CLK}$ clocking the switching converter, and the gate signal $S_G$ which controls the switching state of the half bridge ($SW_1$, $SW_2$).

Figure 2:
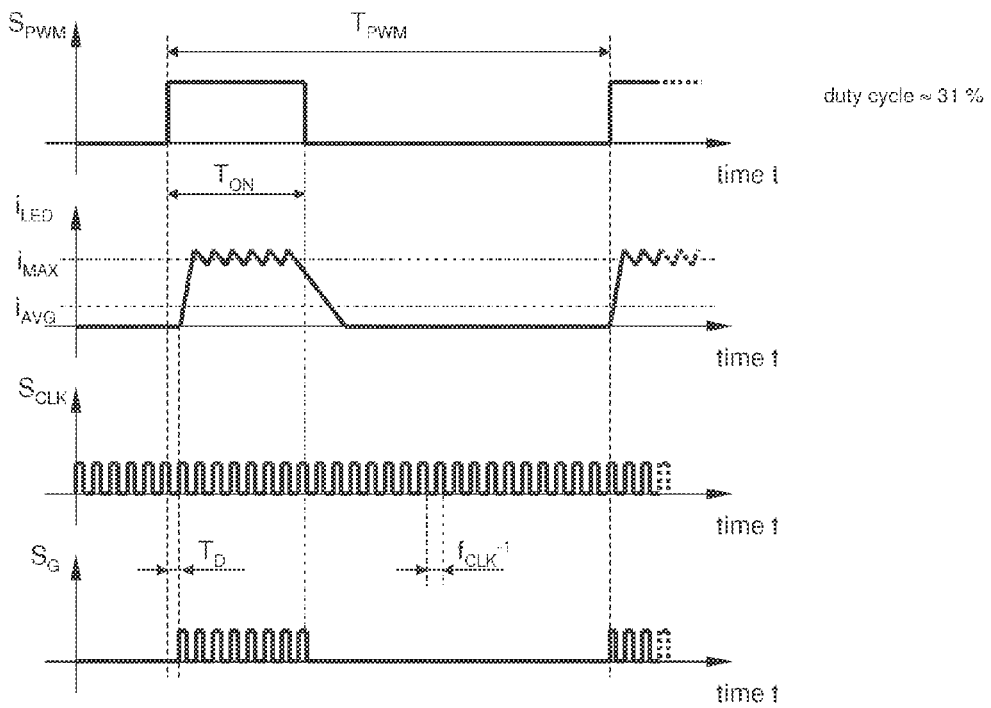
FIG. 2 illustrates using timing diagrams one embodiment of a function of the LED driver circuit of FIG. 1.

The PWM control signal $S_{PWM}$ determines the degree of dimming of the LED as explained above. In the present example of one embodiment illustrated in FIG. 2 the duty cycle of the PWM control signal $S_{PWM}$ is approximately 31 percent, i.e., the LED is dimmed to 31 percent of its maximum radiant power (see first timing diagram of FIG. 2). During the on-time $T_{ON}$ of the PWM control signal $S_{PWM}$ the switching converter operates like a simple buck converter, whereas the buck converter is deactivated during the off-time $T_{OFF}$ of the signal $S_{PWM}$. The resulting pulse width modulated load current $i_{LED}$ is illustrated in the second diagram of FIG. 2. It can be seen from the figure that during the on-time $T_{ON}$ the load current ripples around a maximum load current $i_{MAX}$ (average value over the on-time $T_{ON}$) whereas the effective average load current $i_{AVG}$ (average value over the whole PWM period $T_{PWM}$) is approximately $T_{ON} \cdot i_{MAX}/T_{PWM}$ which yields approximately 31 percent of $i_{MAX}$ in the present example. The third timing diagram of FIG. 2 illustrates the clock signal $S_{CLK}$ of the switching converter. The frequency of the clock signal is denoted as $f_{CLK}$ and is usually much higher than the frequency of the pulse width modulation used for dimming. Frequencies of several kilohertz (e.g., 300 kHz) or even megahertz are used for clocking the switching converters whereas lower frequencies ranging from 100 to 400 Hz (or up to 1 kHz) may be used for modulating the PWM control signal $S_{PWM}$. The gate signal $S_G$ is, dependent on the actual implementation, a signal with a frequency $f_{CLK}$ and a duty cycle that determines the maximum value $i_{MAX}$ of the load current during the on-time of the control signal $S_{PWM}$. In the present example of one embodiment the duty cycle of the gate signal $S_G$ is approximately 50 percent.

The gate signal $S_G$ is only active (i.e., signal level is different from zero) during the on-time $T_{ON}$. As it can be seen from the fourth timing diagram of FIG. 2 a random delay $T_D$ of a maximum duration of $f_{CLK}^{-1}$ may occur at the beginning of an on-time period before the load current is switched on and thus starts to rise. The delay can assume any value lower than $f_{CLK}^{-1}$ since clock signal $S_{CLK}$ and PWM control signal $S_{PWM}$ are not synchronised. In cases of very low duty cycles $T_{ON}/T_{PWM}$, i.e., when dimming the LED down to very low radiant power, this random delay $T_D$ may be a considerable fractional part of the on-time $T_{ON}$ which may result in a visible flickering of the LED.

This effect becomes clear when considering the following example. Assuming the clock frequency $f_{CLK}$ of the switching converter is 10 kHz ($f_{CLK}^{-1}=0.1$ ms) and the period $T_{PWM}$ of the PWM control signal $S_{PWM}$ is 10 ms ($T_{PWM}^{-1}=100$ Hz). Further assuming the LED should be dimmed to five percent of the maximum brightness, i.e., the duty cycle is $T_{ON}/T_{PWM}=0.05$ and the on-time $T_{ON}=0.5$ ms$=5 \cdot f_{CLK}^{-1}$ is only five periods of the clock signal $S_{CLK}$. If the delay $T_D$ varies randomly between zero and $f_{CLK}^{-1}$ then the average current $i_{AVG}$ over one full period $T_{PWM}$ may vary by 20 percent which can be perceived by the human eye as flicker. As a consequence known LED drivers are limited to a minimal on-time $T_{ON,min}$ of $T_{ON,min} > N \cdot f_{CLK}^{-1}$, whereby N is at least 8 or 10 in order to avoid visible flickering effects. For the above example the minimum duty cycle would be approximately 8 to 10 percent.

To overcome the above-described problem the clock frequency $f_{CLK}$ may be increased to the megahertz range which is often undesirable for known reasons. Another possibility is to synchronise the clock signal $S_{CLK}$ of the switching converter with the pulse width modulation control signal $S_{PWM}$ used for brightness control (dimming) as described in U.S. patent application US 2007/0210725 A1. However such synchronisation may also undesired in many application, including when using an external clock generator for clocking the switching converter or when using a switching converter with load current regulation.

Figure 3:
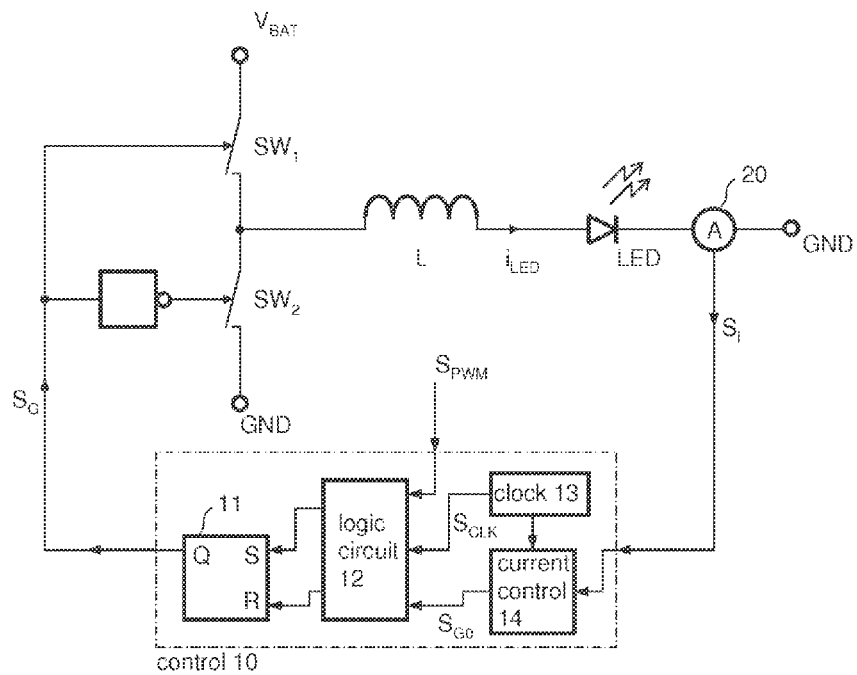
FIG. 3 illustrates one embodiment of the LED driver circuit of FIG. 1 in more detail.

FIG. 3 illustrates one embodiment of an LED driver circuit including a switching converter is illustrated in FIG. 3. This embodiment substantially corresponds to the driver circuit of FIG. 1 except for the control unit 10. One embodiment of a control unit 10 is illustrated in more detail in FIGS. 3 and 4.

The control unit 10 includes a current control unit 14 that receives the current measurement signal $S_i$ representing the actual load current $i_{LED}$ supplied to the LED and that is configured to generate a current control signal $S_{G0}$ dependent on the current measurement signal $S_i$. The control signal $S_{G0}$ is a pulse-width modulated signal with the same frequency as the clock signal $S_{CLK}$. The duty cycle of the control signal represents a desired value of the maximum load current $i_{MAX}$. While the PWM control signal $S_{PWM}$ is high the current control signal $S_{G0}$ is forwarded to the output of the control unit 10 (gate signal $S_G$). The output signal (gate signal $S_G$) of the control unit 10 is supplied to the gates of the transistors $SW_1$, $SW_2$ of the half-bridge. The "forwarding" of the current control signal $S_{G0}$ is implemented by setting a RS-flip-flop 11 at the beginning of each period of the clock signal $S_{CLK}$ (which also triggers the beginning of a corresponding period of the current control signal $S_{G0}$) and resetting the RS-flip-flop 11 dependent on the current control signal $S_{G0}$, e.g., at the end of the duty cycle of the current control signal $S_{G0}$. The respective set and reset signals for the RS-flip-flop 11 are generated by a logic circuit 12, dependent on the current control signal $S_{G0}$ and the clock signal $S_{CLK}$ of the switching converter.

In order to dim the LED the "forwarding" of the current control signal $S_{G0}$ to the half-bridge is blocked by inhibiting that the RS-flip-flop 11 is set, thus deactivating the current supply of the LED while the PWM control signal $S_{PWM}$ is low.

When the PWM control signal $S_{PWM}$ goes high again, the gate signal is set high independent of the clock signal $S_{CLK}$. This may be done by providing a set event (e.g., a pulse, a rising edge of a high level) to the set input of the flip-flop 11, independently of the phase of the clock signal $S_{CLK}$. Later the set input of the flip-flop 11 is triggered by the clock signal as described above. In the case the clock signal is a sequence of equidistant pulses (distance in time is $f_{CLK}^{-1}$) each pulse setting the RS-flip-flop 11 an additional set pulse may be "inserted" into the clock signal in response to a rising edge in the pulse width modulated control signal $S_{PWM}$. The above-mentioned random delay time $T_D$ at the begin of a duty cycle of the PWM control signal $S_{PWM}$ is thus avoided.

Figure 4:
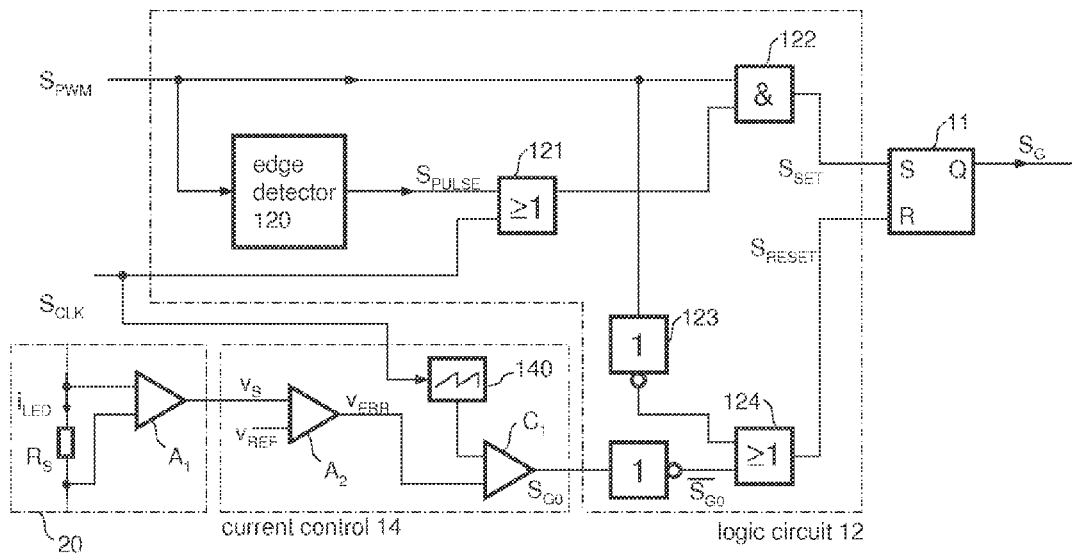
FIG. 4 illustrates one embodiment of a part of a control circuit used within the LED driver circuit of FIG. 3.

One embodiment of the control unit 10 is illustrated in FIG. 4. The illustrated control unit 10 includes a current control unit 14, a logic circuit 12, and the RS-flip-flop 11. Furthermore, the current measurement unit 20 is illustrated in more detail, whereby in the present example the amplified voltage drop $V_S$ across a shunt resistor $R_S$ is used as current measurement signal $S_I$ (cf. FIG. 4: difference amplifier $A_1$). One embodiment of the current control unit 14 includes an error amplifier $A_2$ that provides an error signal $V_{ERR}$ which is proportional to the difference (i.e., error) $V_S-V_{ERR}$. The current control unit 14 further includes a sawtooth signal generator 140 for providing a sawtooth signal with a frequency $f_{CLK}$ provided, for example, by the clock generator 13. The error signal $V_{ERR}$ is compared to the sawtooth signal (comparator $C_1$) and the current control signal $S_{G0}$ is generated dependent on the result of the comparison. FIG. 4 illustrates only a very basic example of the current control unit 14. However, a skilled person will understand that various known types of current control commonly used in switching converters may be applicable to the present embodiment.

The logic circuit 12 of FIG. 4 is configured to set the flip-flop 11 at the beginning of each clock period of the switching converter defined by the clock signal $S_{CLK}$, if the PWM control signal $S_{PWM}$ indicates that current control should be active (i.e., if $S_{PWM}$ has a high level). Additionally, the logic circuit 12 is configured to set the flip-flop 11 at the beginning of a PWM cycle defined by the PWM control signal $S_{PWM}$, which is usually at a rising edge of the signal $S_{PWM}$. This function is provided by the edge detector 120, that is configured to provide a pulse $S_{PULSE}$ each time a rising edge in the signal $S_{PWM}$ occurs, and the OR-gate 121 and the AND-gate 122, whereby the OR-gate 121 combines the output signal $S_{PULSE}$ of the edge detector 120 and the clock signal SCLK which is a series of subsequent pulses equidistant in time. Consequently the output of the OR-gate 121 is a signal of subsequent pulses, a pulse occurring at the beginning of each clock cycle and additionally when a rising edge in the PWM control signal $S_{PWM}$ occurs. This output signal of the OR-gate 121 is combined with the PWM control signal $S_{PWM}$ by the AND-gate 122. Thus, the output signal of the OR-gate 121 is only forwarded to the set input of the flip-flop 11 during the on-time of PWM control signal $S_{PWM}$.

The logic circuit 12 of FIG. 4 is further configured to reset the flip-flop 11 either when the PWM control signal $S_{PWM}$ goes low (i.e., after the on-time $T_{ON}$ has elapsed) or when the current control signal $S_{G0}$ goes low. This function is provided by the OR-gate 124 which has an inverted input (inverter 123) receiving the signal $S_{PWM}$ and a second input receiving the current control signal $S_{G0}$. The output of OR-gate 124 is supplied to the reset input of flip-flop 11.

The logic circuit 12 and the flip-flop 11 together provide the function of copying, during the on-time $T_{ON}$ of the PWM control signal $S_{PWM}$, the current control signal $S_{G0}$ to the flip-flop output thus providing a gate signal $S_G$ to the half bridge, whereby a rising edge in the gate signal that (according to signal $S_{G0}$) would occur directly after the start of the on-time $T_{ON}$ is preponed to the starting point of the on-time $T_{ON}$.

Figure 5:
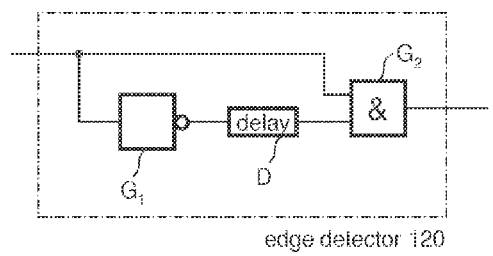
FIG. 5 illustrates one embodiment of an edge detection circuit used within the LED driver of FIG. 3.
Figure 6:
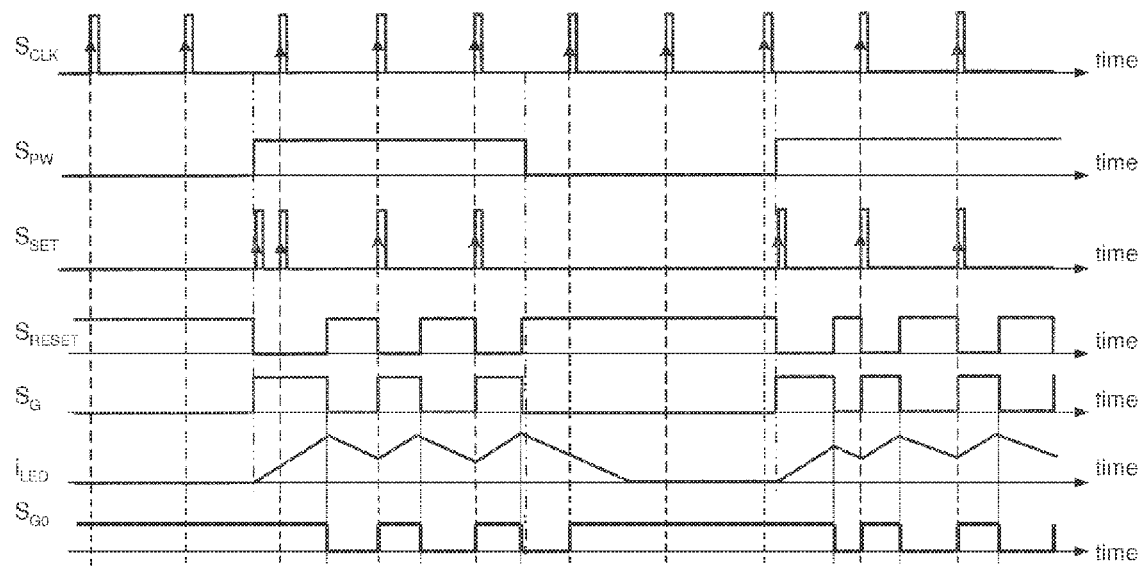
FIG. 6 illustrates using timing diagrams one embodiment of a function of the circuits of FIGS. 3 and 4 in more detail.

FIG. 5 illustrates an example of an edge detector 120. FIG. 6 illustrates the above-described function of the circuit of FIGS. 3 and 4 by using timing diagrams. The edge detector 120 of FIG. 5 includes an AND-gate $G_2$, a delay element D and an inverter $G_1$. On a rising edge (from a low level to a high level) at the input of the edge detector, the AND-gate $G_2$ generates a pulse at its output, whereby the pulse width is determined by the delay of the delay line and the propagation delay of the gates $G_1$, $G_2$.

The function of the control unit 10 of the switching converter of FIGS. 3 and 4 is illustrated in FIG. 6 using timing diagrams (from top to bottom) of the clock signal $S_{CLK}$, the PWM control signal $S_{PWM}$, the set signal $S_{SET}$ present at the set input of the flip-flop 11, the reset signal $S_{RESET}$ present at the reset input of the flip-flop 11, the gate signal $S_G$ supplied to the transistors $SW_1$, $SW_2$ of the half-bridge, and the LED current $i_{LED}$.

The clock signal $S_{CLK}$ is a series of subsequent, equidistant pulses with a repetition rate of $f_{CLK}$ (clock frequency). The clock signal $S_{CLK}$ defines the operating frequency of the switching converter and lies in the range of several kilohertz, e.g., 20 kHz up to 2 MHz. The current control signal $S_{G0}$ (not illustrated) is synchronous with the clock signal $S_{CLK}$ and defines the maximum LED current $i_{MAX}$. The PWM control signal $S_{PWM}$ defines the time periods during which the switching converter is active ($i_{LED} \approx i_{MAX}$ during on-time $T_{ON}$) and inactive ($i_{LED} \approx 0$ during off-time $T_{OFF}=T_{PWM}-T_{ON}$). Therefore, the pulses of the clock signal $S_{CLK}$ is only forwarded to the set input of the flip-flop 11 when signal $S_{PWM}$ is high; additionally a pulse is generated and also supplied set input of the flip-flop 11 when a rising edge in signal $S_{PWM}$ occurs. Consequently, the set signal $S_{SET}$ supplied to the set input of the flip-flop 11 may be calculated as $$S_{SET}=(S_{CLK} \text{ OR } S_{PULSE}) \text{ AND } S_{PWM},$$

where signal $S_{PULSE}$ exhibits a pulse each time a rising edge in signal $S_{PWM}$ occurs. The signal $S_{RESET}$ supplied to the reset input of the flip-flop 11 may be calculated as $$S_{RESET}=(\text{NOT } S_{PWM}) \text{ OR } (\text{NOT } S_{G0})=S_{PWM} \text{ NAND } S_{G0},$$

that is, the gate signal $S_G$ is reset when the $S_{PWM}$ goes low or at the end of the duty cycle of the current control signal $S_{G0}$. The resulting LED current $i_{LED}$ is illustrated in the last but one diagram of FIG. 6. During the on-time $T_{ON}$ of signal $S_{PWM}$ the LED current $i_{LED}$ oscillates around the mean maximum value $i_{MAX}$, while during the off-time of signal $S_{PWM}$ the LED current $i_{LED}$ goes down to zero. Therefore, the value of the inductance L has to be high enough to provide sufficient averaging of the current during the on-time $T_{ON}$ and low enough that the current goes down to zero during the off-time $T_{OFF}$. In practice the design of the inductance value is not a problem, since the clock frequency, as mentioned above, is in the kilohertz range and the PWM frequency $1/(T_{ON}+T_{OFF})$ is in the range from about 100 to 400 Hz.

The last (bottom) diagram of FIG. 6 illustrates the current control signal $S_{G0}$ provided by current control unit 14. It can be seen that during the duty cycle of the PWM control signal $S_{PWM}$ the current control signal $S_{G0}$ is forwarded as gate signal $S_G$ to drive the switching converter. During the pause cycle of the PWM control signal $S_{PWM}$ the current controller provides maximum output (duty cycle of current control signal $S_{G0}$ is 100 percent) since the actual LED current $i_{LED}$ is zero whereas the desired LED current—from the current controller's 14 "point of view"—is the maximum current $i_{MAX}$.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for supplying current to a load comprising:
a switching converter for providing a load current to the load; the switching converter comprises a switching circuit;
a current control unit generating a modulated current control signal representing a desired load current, the switching circuit being driven dependent on the modulated current control signal; and
a logic circuit receiving a pulse-width-modulated control signal representing a desired dimming ratio and configured to generate a gate signal for driving the switching circuit dependent on the current control signal during a duty cycle of the pulse-width-modulated control signal, whereby the logic circuit is configured to activate the switching converter, independent on the state of the current control signal, at the beginning of the duty cycle of the pulse-width-modulated control signal.

2. The system of claim 1, further comprising:
a clock generator providing a clock signal for clocking the switching converter,
whereby the logic circuit comprises a flip-flop, the flip-flop being set at the beginning of each clock period of the clock signal and in response to each rising edge of the pulse-width-modulated control signal.

3. The system of claim 2, whereby the flip-flop is reset dependent on the current control signal and in response to a falling edge of the pulse-width-modulated control signal.

4. The system of claim 1, further comprising:
a current measuring unit configured to provide a current measurement signal representing the load current to the current control unit.

5. The system of claim 1, whereby the switching converter comprises an inductance which inductance value is high enough to provide, at a given frequency of the clock signal an averaging of the load current over one period of the clock signal.

6. The system of claim 5, comprising wherein the inductance value is low enough to allow the load current, at a given frequency of the pulse-width-modulated control signal.

7. A method for supplying current to a load comprising:
providing a load current to the load by using a switching converter including a switching circuit;
generating a modulated current control signal representing a desired load current;
providing a pulse-width-modulated control signal representing a desired dimming ratio; and
generating a gate signal for driving the switching circuit dependent on the current control signal during a duty cycle of the pulse-width-modulated control signal,
whereby the switching converter is activated, independent on the state of the current control signal, at the beginning of the duty cycle of the pulse-width-modulated control signal.

8. The method of claim 7 further comprising:
providing a clock signal for clocking the switching converter, the frequency of the clock signal being higher than the frequency of the pulse-width-modulated control signal;
setting a flip-flop at the beginning of each clock period of the clock signal during a duty cycle of the pulse-width-modulated control signal; and
setting the flip-flop in response to each rising edge of the pulse-width-modulated control signal.

9. The method of claim 8 further comprising:
resetting the flip-flop dependent on the current control signal; and
resetting the flip-flop in response to a falling edge of the pulse-width-modulated control signal.

10. A system comprising:
a switching converter for providing a load current to the load;
a current control unit generating a modulated current control signal; and
a logic circuit receiving a pulse-width-modulated control signal representing a desired dimming ratio and configured to generate a gate signal for driving the switching circuit dependent on the current control signal during a duty cycle of the pulse-width-modulated control signal, whereby the logic circuit is configured to activate the switching converter, independent on the state of the current control signal, at the beginning of the duty cycle of the pulse-width-modulated control signal.

11. The system of claim 10, further comprising:
a clock generator providing a clock signal for clocking the switching converter,
whereby the logic circuit comprises a flip-flop, the flip-flop being set at the beginning of each clock period of the clock signal and in response to each rising edge of the pulse-width-modulated control signal.

12. The system of claim 11, whereby the flip-flop is reset dependent on the current control signal and in response to a falling edge of the pulse-width-modulated control signal.

13. The system of claim 10, further comprising:
a current measuring unit configured to provide a current measurement signal representing the load current to the current control unit.

14. The system of claim 10, whereby the switching converter comprises an inductance which inductance value is high enough to provide, at a given frequency of the clock signal an averaging of the load current over one period of the clock signal.

15. The system of claim 14, comprising wherein the inductance value is low enough to allow the load current, at a given frequency of the pulse-width-modulated control signal.

* * * * *

UNITED STATES PATENT AND TRADEMARK OFFICE
CERTIFICATE OF CORRECTION

| | | |
|---|---|---|
| PATENT NO. | : 8,035,312 B2 | Page 1 of 1 |
| APPLICATION NO. | : 12/433194 | |
| DATED | : October 11, 2011 | |
| INVENTOR(S) | : Emanuele Bodano | |

It is certified that error appears in the above-identified patent and that said Letters Patent is hereby corrected as shown below:

Title page, item (75); Inventor city, delete "Padua" and insert in place thereof --Padova--.

Signed and Sealed this
Sixth Day of March, 2012

David J. Kappos
*Director of the United States Patent and Trademark Office*